(12) United States Patent
Jeong et al.

(10) Patent No.: US 6,903,500 B2
(45) Date of Patent: Jun. 7, 2005

(54) FIELD EMITTER DEVICE COMPRISING CARBON NANOTUBE HAVING PROTECTIVE MEMBRANE

(75) Inventors: Tae-won Jeong, Seoul (KR); Ji-beom Yoo, Kyungki-do (KR); Whi-kun Yi, Kyungki-do (KR); Jeong-hee Lee, Kyungki-do (KR); Se-gi Yu, Kyungki-do (KR); Chang-soo Lee, Kyungki-do (KR); Jung-na Heo, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 170 days.

(21) Appl. No.: 10/337,858

(22) Filed: Jan. 8, 2003

(65) Prior Publication Data

US 2003/0127960 A1 Jul. 10, 2003

(30) Foreign Application Priority Data

Jan. 10, 2002 (KR) ................................ 10-2002-0001383

(51) Int. Cl.$^7$ .............................. H01J 1/30; H01J 19/24
(52) U.S. Cl. ........................ 313/309; 313/336; 313/351; 313/355; 313/311
(58) Field of Search ........................ 313/309–311, 336, 313/345, 351, 355, 495

(56) References Cited

U.S. PATENT DOCUMENTS

| 6,232,706 B1 | | 5/2001 | Dai et al. | |
|---|---|---|---|---|
| 6,239,547 B1 | | 5/2001 | Uemura et al. | |
| 6,333,598 B1 | * | 12/2001 | Hsu et al. | 313/495 |
| 6,472,802 B1 | * | 10/2002 | Choi et al. | 313/309 |
| 6,770,497 B2 | * | 8/2004 | Ihm | 438/20 |

FOREIGN PATENT DOCUMENTS

| GB | 2 370 408 A | 6/2002 |
|---|---|---|
| JP | 11-269105 | 9/1999 |
| WO | WO 01/61719 A1 | 8/2001 |

* cited by examiner

*Primary Examiner*—Ashok Patel
(74) *Attorney, Agent, or Firm*—Burns, Doane, Swecker & Mathis, L.L.P.

(57) ABSTRACT

A field emitter device including carbon nanotubes each of which has a protective membrane is provided. The protective membrane is formed of a nitride, a carbide, or an oxide. Suitable nitrides for the protective membrane include boron nitride, aluminum nitride, boron carbon nitride, and gallium nitride. The protective membrane protects the carbon nanotubes from damage due to arcing or an unnecessary remaining gas and thus improves field emission characteristics and stability of the field emitter device.

11 Claims, 6 Drawing Sheets

FIELD EMITTER DEVICE COMPRISING CARBON NANOTUBE HAVING PROTECTIVE MEMBRANE

CROSS-REFERENCE TO RELATED APPLICATIONS

This application is based upon and claims priority from Korean Patent Application No. 2002-1383 filed Jan. 10, 2002, the contents of which are incorporated herein by reference.

BACKGROUND OF THE INVENTION

1. Field of the Invention

The present invention relates to a field emitter device, and more particularly, to a field emitter device comprising carbon nanotubes.

2. Description of the Related Art

A field emitter device is used as a field emitter source for a field emission display (FED) as one of the promising next generation flat displays. The field emitter device provides high picture quality, high efficiency, and low power consumption, compared to conventional cathode ray tubes.

The performance of the field emitter device relies on processing techniques applied to fabricate the same and its stability. Recently, many attempts have been made to apply a highly conductive, stable carbon nanotube to the field emitter device.

In the field of displays, a field emitter device including carbon nanotubes is manufactured typically by a plasma chemical vapor deposition method disclosed in U.S. Pat. No. 6,232,706 and a method using a paste disclosed in U.S. Pat. No. 6,239,547.

According to the plasma chemical vapor deposition method, ethylene gas is injected between two electrodes in a reactor in the presence of a nickel catalyst, and the ethylene gas is energized by a direct current or high-frequency electric field to generate plasma by glow discharge and thus to grow carbon nanotubes on the electrode using the plasma energy.

According to the field emitter device fabricating method using the paste, carbon nanotubes are processed into carbon nanoparticles by laser ablation or arc discharge, mixed with a conductive or non-conductive paste, and printed.

In the conventional plasma chemical vapor deposition method, due to a high voltage applied between the field emitter tip and an anode, the remaining plasma gas occurs arcing to damage the carbon nanotubes. Here, "arcing" refers to a an instantaneous electrical short between the anode and a gate electrode in a vacuum tube where the field emitter device is placed, which increases a voltage applied to the gate electrode and thus damages a gate insulating layer and a resistive layer.

In the conventional field emitter device fabricating method using the paste, the carbon nanoparticles are mixed with a costly silver paste or polymeric compound and thermally treated at a temperature of 350–500° C. As a result, the carbon nanoparticles are oxidized to reduce the lifetime of the carbon nanoparticles. In addition, in the manufacture of a field emitter device fabricating apparatus using this method, an extended period of heating time is required, and outgassing induces gas, such as oxygen, to remain and to be adsorbed onto the carbon nanoparticles, thereby suppressing electron emission and reducing the lifetime of the field emitter device.

FIG. 1 is a transmission electron microscopic (TEM) photograph of conventional carbon nanotubes. Field emission characteristics of the conventional carbon nanotubes shown in FIG. 1 with respect to time are shown in FIGS. 2A and 2B.

Referring to FIG. 1, the field emission characteristics were measured in a vacuum of $1 \times 10^{-7}$ mbar from starting up to 8 hours, in an oxygen atmosphere of $1 \times 10^{-6}$ mbar up to 11 hours and an increased oxygen pressure of $5 \times 10^{-5}$ mbar up to 17 hours, and in a vacuum of $1 \times 10^{-7}$ mbar. When the oxygen pressure was increased to $5 \times 10^{-5}$ mbar after passing 11 hours from the start, a great degradation in the field emission characteristics is apparent. When the measuring condition was back to the vacuum, the current emission was instantaneously increased but reduced in a short period of time. The current emission drop following the instantaneous increase after passing 21 hours from the start is because the remaining carbon nanotubes undamaged by oxygen suddenly emit electrons and disappear as the measuring condition is changed to the vacuum where impurities such as oxygen do not exist.

Referring to FIG. 2B, as oxygen injection is started after a vacuum of $2 \times 10^{-7}$ mbar is maintained for 3 hours and 40 minutes, the current emission drops from 1 $\mu$A to $10^{-6}$ $\mu$A. When the condition was changed back to the vacuum after 6 hours and 40 minutes were passed from the start, the field emission characteristic was not recovered to that in the initial vacuum condition.

In other words, when a remaining gas, such as oxygen, exist in the conventional field emitter device, current emission greatly decreases over time and is not recovered to an initial level of the current emission even when the oxygen is evacuated to create the initial vacuum condition.

SUMMARY OF THE INVENTION

Accordingly, it is an object of the present invention to provide a field emitter device with improved field emission and stability, which includes carbon nanotubes whose tips are coated with a protective membrane.

To achieve the object of the present invention, it is provided a field emitter device comprising carbon nanotubes each of which has a protective membrane.

Preferably, the protective membrane is formed of one material selected from the group consisting of nitrides, carbides, and oxides. Suitable nitrides include boron nitride, aluminum nitride, boron carbon nitride, and gallium nitride. Suitable carbides include diamond and diamond-like carbon. Suitable oxides include magnesium oxide, silicon dioxide, and aluminum oxide.

Preferably, the protective membrane is coated on the tip of each of the carbon nanotubes.

According to the present invention, the carbon nanotubes are coated with a protective membrane of, such as boron nitride, to relieve damage due to arcing and to extend the lifetime of the field emitter device. In addition, lowered work function of electrons facilitates electron emission and thus improves electron emission characteristics and stability of the field emitter device. For reference, the "work function" means the minimum energy needed to remove an electron from the Fermi level of a metal.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Embodiments of a field emitter device including carbon nanotubes having a protected membrane according to the present invention will be described in greater detail with reference to the appended drawings.

Figure 3:
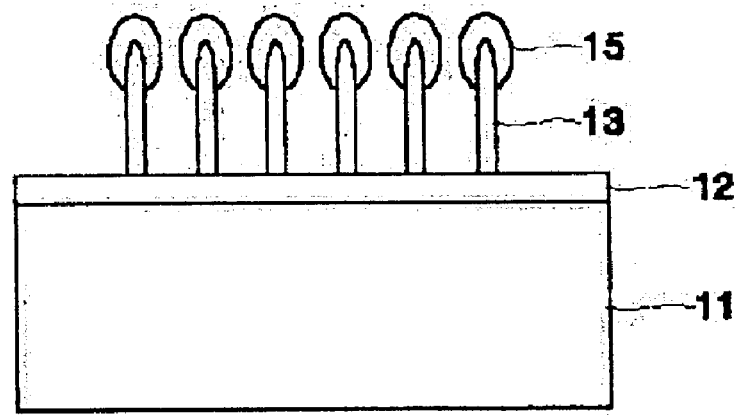
FIG. 3 shows the structure of a field emitter device including carbon nanotubes having a protective membrane according to an embodiment of the present invention.

FIG. 3 shows the structure of a field emitter device according to an embodiment of the present invention. Referring to FIG. 3, the field emitter device includes a substrate 11, a cathode 12 stacked on the substrate 11, carbon nanotubes 13 on the cathode 12, and a protective membrane 15 coating each tip of the carbon nanotubes 13.

As a voltage is applied across the cathode 12 on one surface of the substrate 11 and an anode (not shown) formed on the surface of the substrate 11 opposite to opposite to the cathode 12, and the generated electric energy is greater than the work function of electrons, electrons are emitted from the tips of the carbon nanotubes 13.

Since the carbon nanotubes 13 inherently have a weak working field strength, an electron emission (diode emission), which is not induced by the gate electrode in a triode structure, may occur as the voltage of the anode rises over a predetermined voltage level. In this case, arcing is likely to occur, and an unnecessary gas produced due to outgassing during operation of the field emitter device is adsorbed onto the carbon nanotubes 13, thereby degrading the field emission of the carbon nanotubes 13 or reducing the lifetime of the field emitter device.

The protective membrane 15 is coated selectively on each tip of the carbon nanotubes 13 to protect the carbon nanotubes 13 from being damaged due to the arcing or outgassing or from characteristic degradation.

Suitable methods for coating the protective membrane 15 include a sputtering method, an electron beam evaporation method, a laser evaporation method, a chemical vapor deposition (CVD) method, and a sol-gel method.

In the sputtering method, a substrate formed of a material for the protective layer 15 is bombarded with high-energy particles to separate molecules from the substrate and to form the protective membrane 15 of the separated molecules. In the electron beam evaporation method, a material for the protective membrane 15 is bombarded with accelerated electron beams to convert the motion energy of the electrons into heat energy to vaporize the material to be deposited on the carbon nanotubes 13. The laser evaporation method utilizes the same principles of the electron beam evaporation method, except for a laser beam is used instead of the electron beam.

In the CVD method, a reactive gas having the same composition as a material for the protective membrane 15 is sprayed over the carbon nanotubes 13 at a constant rate to be deposited on the carbon nanotubes 13. In the sol-gel method, a material for the protective membrane 15 is dissolved in a solution and coated on the carbon nanotubes 13. Next, the solvent is removed by vaporization to result in the protective membrane 15.

The protective membrane 15 is formed of a material with electrophilicity, chemical stability, thermal stability, and strong hardness, for example, nitrides, carbides, oxides, etc.

Suitable nitrides for the protective membrane 15 include boron nitride (BN), aluminium nitride (AlN), boron carbon nitride (BCN), gallium nitride GaN, etc. Suitable carbides for the protective membrane 15 include diamond, diamond-like carbon (DLC), etc. Suitable oxides for the protective membrane 15 include magnesium oxide (MgO), silicon dioxide ($SiO_2$), aluminium oxide ($Al_2O_3$), etc.

Figure 1:
FIG. 1 is a transmission electron microscopic (TEM) photograph of conventional carbon nanotubes.
Figure 4:
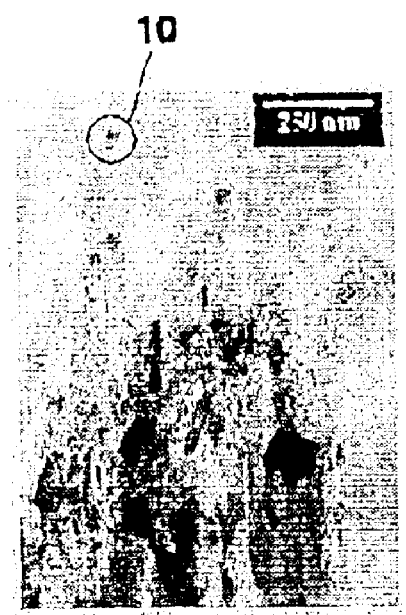
FIG. 4 is a TEM photograph of a field emitter device according to an embodiment of the present invention, including carbon nanotubes having a protective membrane of boron nitride.

FIG. 4 is a transmission electron microscopic (TEM) photograph of a field emitter device according to an embodiment of the present invention, including carbon nanotubes having a protective membrane. Compared with the conventional carbon nanotubes of FIG. 1, having no protective membrane, the tips of the carbon nanotubes appear to be unclear due to the protective membrane of boron nitride appearing to be slightly dark, as indicated by reference numeral 10.

Figure 5A:
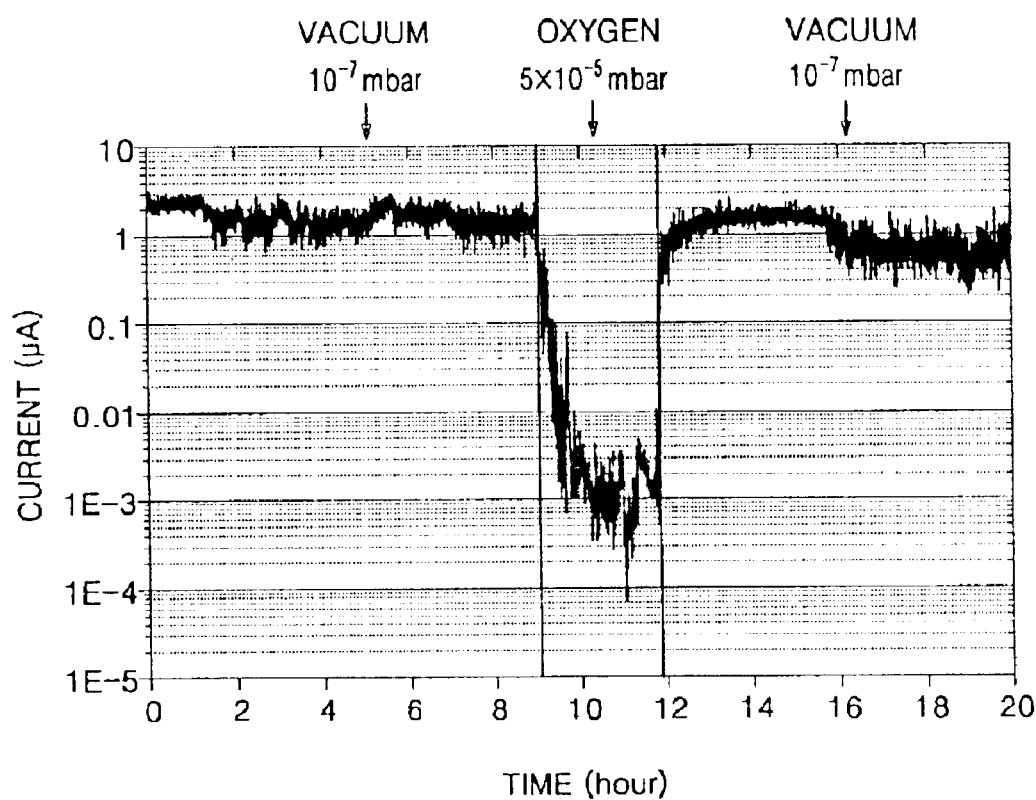
FIG. 5A is a graph of current emission stability versus time in the carbon nanotubes having a protective membrane of boron nitride according to an embodiment of the present invention.

FIG. 5A is a graph of current emission versus time, showing field emission characteristics of an embodiment of the field emitter device according to the present invention, including carbon nanotubes coated with a protective membrane of boron nitride. As shown in FIG. 5A, a vacuum of $1 \times 10^{-7}$ mbar was maintained for 9 hours, followed by oxygen injection to a pressure of $5 \times 10^{-5}$ mbar up to 12 hours from the start of the electric field emission measurement. In this oxygen condition, a great reduction in the current emission was apparent. Numerically, a current emission of 1 $\mu$A for the initial 9 hours dropped to $10^{-3}$ $\mu$A after about 10 hours from the start. However, when the oxygen was evacuated to return to the initial vacuum condition of $1 \times 10^{-7}$ mbar, the current emission was recovered to the initial level. This is because the oxygen adsorbed onto the protective membrane 15 of the carbon nanotubes 13 to hinder the electron emission is separated from the protective membrane 14 as the oxygen condition is changed to the vacuum condition, thereby enabling the normal electron emission.

Figure 2A:
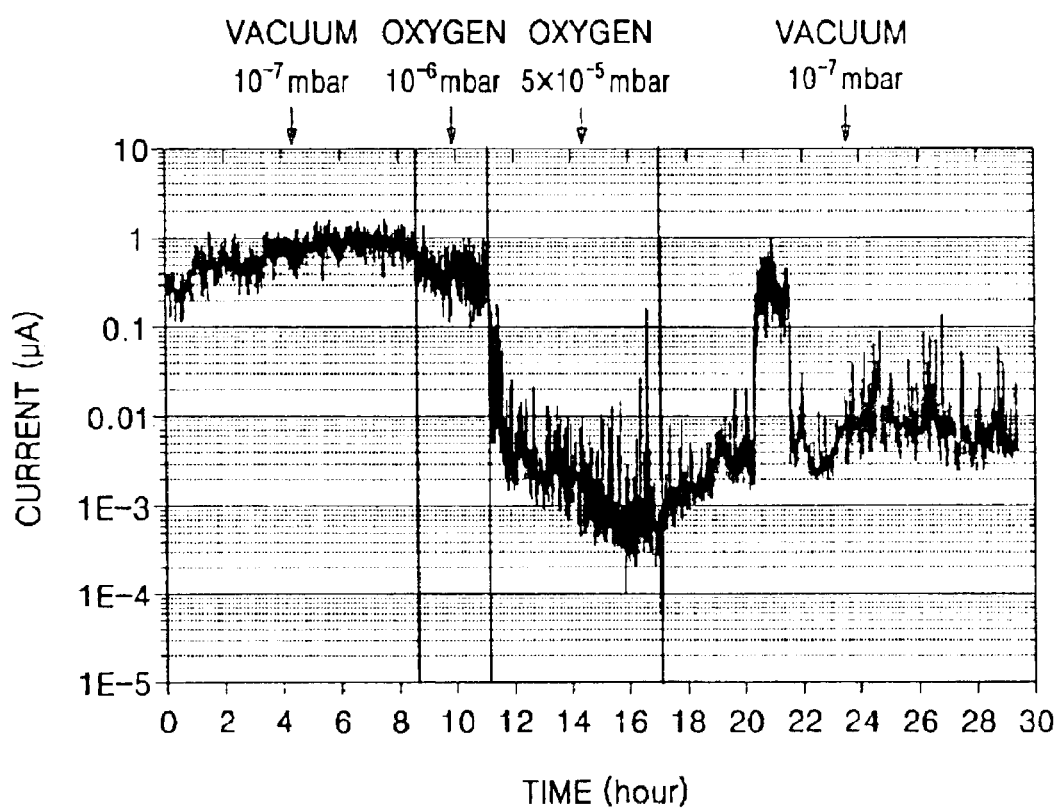
FIGS. 2A and 2B are graphs showing field emission characteristics of the conventional carbon nanotubes, which have no protective membrane, shown in FIG. 1.

The recovery of the electron emission characteristics is the difference between the conventional emitter device including carbon nanotubes shown in FIG. 2A and the field emitter device according to the present invention, including the carbon nanotubes protected by the protected membrane. The conventional field emitter device failed to recover its field emission characteristics even when the condition was returned to the vacuum after the oxygen injection, as shown in FIG. 2A. However, as is apparent in FIG. 5A, the field emission characteristics of the field emitter device according to the present invention were recovered to the initial level in the vacuum condition following the oxygen injection.

From the difference in the field emission characteristics, it is evident that the protective membrane 15 of boron nitride can prevent damage of the carbon nanotubes and can improve field emission characteristics and stability of the field emitter device.

Figure 2B:
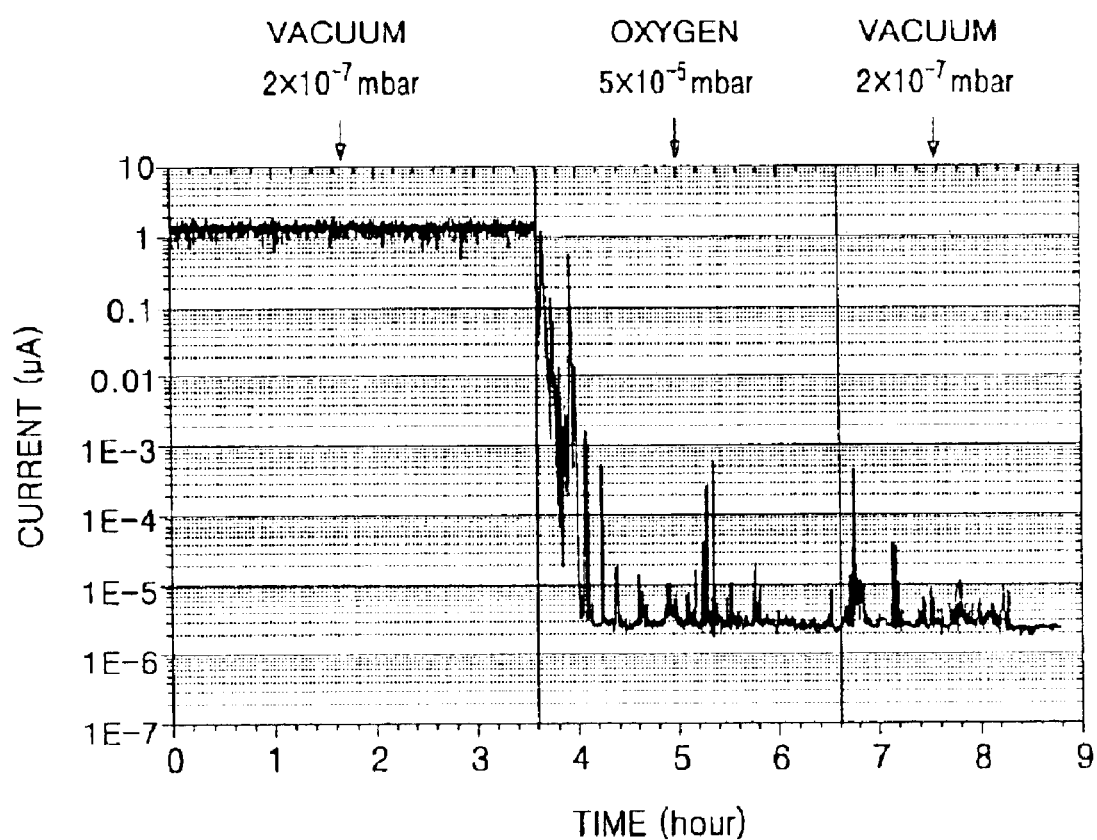
Figure 5B:
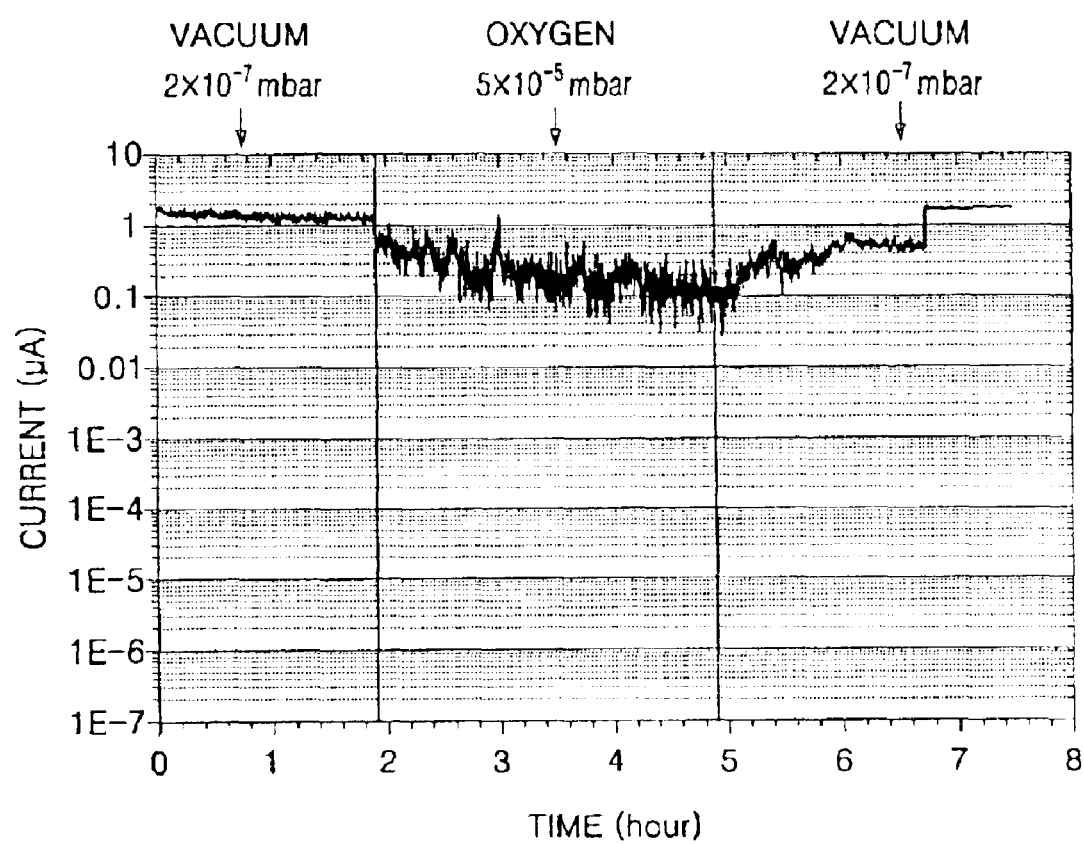
FIG. 5B is a graph of current emission stability versus time in carbon nanotubes having a protective membrane of magnesium oxide according to an embodiment of the present invention.

FIG. 5B is a graph showing field emission characteristics of carbon nanotubes having a protective membrane of magnesium oxide, instead of boron nitride, according to the present invention. The field emission characteristics were measured in the same conditions as for the conventional carbon nanotubes of FIG. 2B having no protective membrane. In comparison with the graph of FIG. 2B, the carbon nanotubes having the magnesium oxide protective membrane showed a very small reduction in the current emission even after the oxygen injection and almost 100% current emission recovery when the condition was returned to the vacuum condition of the initial level.

While the present invention has been particularly described in the above with reference to embodiments thereof, the above embodiments of the present invention are for illustrative purposes and are not intended to limit the scope of the invention.

For example, it will be understood by those skilled in the art that any material with electriophilicity, chemical and thermal stabilities, and strong hardness can be used as the material for the protective membrane of the carbon nanotubes, without departing from the spirit and scope of the invention as defined by the appended claims.

As described above, in the field emitter device including the carbon nanotubes having a protective membrane according to the present invention, advantageously, the carbon nanotubes can be protected from damage due to arcing, and field emission characteristics and stability of the field emitter device are improved.

What is claimed is:

1. A field emitter device comprising carbon nanotubes wherein only electron-emitting tips of each of which has a protective membrane.

2. The field emitter device of claim 1, wherein the protective membrane is formed of one material selected from the group consisting of nitrides, carbides, and oxides.

3. The field emitter device of claim 1, wherein the protective membrane is formed of boron nitride.

4. The field emitter device of claim 1, wherein the protective membrane is formed of diamond.

5. The field emitter device of claim 1, wherein the protective membrane is formed of magnesium oxide.

6. The field emitter device of claim 1, wherein the protective membrane is formed of aluminum nitride.

7. The field emitter device of claim 1, wherein the protective membrane is formed of boron carbon nitride.

8. The field emitter device of claim 1, wherein the protective membrane is formed of gallium nitride.

9. The field emitter device of claim 1, wherein the protective membrane is formed of diamond-like carbon.

10. The field emitter device of claim 1, wherein the protective membrane is formed of silicon dioxide.

11. The field emitter device of claim 1, wherein the protective membrane is formed of aluminum oxide.

* * * * *